(12) United States Patent
Garcia-Mendoza Sanchez et al.

(10) Patent No.: US 10,033,788 B2
(45) Date of Patent: Jul. 24, 2018

(54) METHOD AND A SYSTEM FOR SMOOTH STREAMING OF MEDIA CONTENT IN A DISTRIBUTED CONTENT DELIVERY NETWORK

(71) Applicant: TELEFONICA DIGITAL ESPANA, S.L.U., Madrid (ES)

(72) Inventors: Armando Antonio Garcia-Mendoza Sanchez, Madrid (ES); Antoni Silvestre Padros, Madrid (ES); José Carlos Pujol Alcolado, Madrid (ES); Jorge Hernández Pablo, Madrid (ES)

(73) Assignee: TELEFONICA DIGITAL ESPAÑA, S.L.U., Madrid (ES)

( * ) Notice: Subject to any disclaimer, the term of this patent is extended or adjusted under 35 U.S.C. 154(b) by 660 days.

(21) Appl. No.: 14/582,725

(22) Filed: Dec. 24, 2014

(65) Prior Publication Data

US 2015/0188974 A1 Jul. 2, 2015

(30) Foreign Application Priority Data

Dec. 26, 2013 (EP) .................................. 13382557

(51) Int. Cl.
*H04L 29/06* (2006.01)
*G06F 17/30* (2006.01)
(Continued)

(52) U.S. Cl.
CPC ...... *H04L 65/607* (2013.01); *G06F 17/30339* (2013.01); *H04L 65/4084* (2013.01);
(Continued)

(58) Field of Classification Search
CPC .......... G06Q 30/0277; H04L 29/06027; H04L 65/4084; H04L 65/4076; H04L 65/607;
(Continued)

(56) References Cited

U.S. PATENT DOCUMENTS 7,818,444 B2 * 10/2010 Brueck ............. H04L 29/06027
709/231
7,925,774 B2 * 4/2011 Zhang ................ H04N 21/2358
707/711

(Continued)

OTHER PUBLICATIONS

European Search Report for 13382557.0 dated Apr. 10, 2014.
Written Opinion for 13382557.0 dated Apr. 10, 2014.

*Primary Examiner* — Kevin Bates
*Assistant Examiner* — Ranjan Pant
(74) *Attorney, Agent, or Firm* — Sughrue Mion, PLLC

(57) ABSTRACT

A method and a system for smooth streaming of media content in a distributed content delivery network, including encoding original media files; providing the encoded original media files to an indexer entity; calculating, the indexer entity, index jump tables for all the encoded original media files; ingesting the index jump tables and the encoded original media files to an origin server; requesting an end user to a SSS a stream fragment; retrieving, the SSS from the origin server, a specific index jump table associated to the requested stream fragment, and using the table to find out and retrieve, from the origin Server, a needed encoded original media file block; and retrieving, the SSS, the requested stream fragment out of the encoded media file block, and sending the requested stream fragment to the end user.

13 Claims, 7 Drawing Sheets

(51) Int. Cl.
*H04N 21/231* (2011.01)
*H04N 21/845* (2011.01)
*H04L 29/08* (2006.01)
*H04N 21/854* (2011.01)

(52) U.S. Cl.
CPC ...... *H04L 65/4092* (2013.01); *H04L 67/2833* (2013.01); *H04L 67/2842* (2013.01); *H04N 21/23116* (2013.01); *H04N 21/8455* (2013.01); *H04N 21/8456* (2013.01); *H04N 21/85406* (2013.01); *H04L 67/322* (2013.01)

(58) Field of Classification Search
CPC . H04L 65/608; H04L 67/2842; H04L 67/289; H04L 65/4092; H04L 67/322; H04L 67/02; H04L 67/2833; G06F 17/30902; G06F 17/30339; H04N 21/23116; H04N 21/4222; H04N 21/8455; H04N 21/8456; H04N 21/85406; H04N 5/4403; H04N 21/6587; H04N 7/17336; H04N 21/2387; H04N 21/47202; H04N 7/17318; H04N 21/47217; H04N 21/2225; H04N 21/23106; H04N 21/4325; H04N 21/4333
See application file for complete search history.

(56) References Cited

U.S. PATENT DOCUMENTS

| | | | | |
|---|---|---|---|---|
| 7,949,775 B2* | 5/2011 | Virdi | | H04N 21/2358 709/231 |
| 8,265,140 B2* | 9/2012 | Mehrotra | | H04N 19/147 375/240.02 |
| 8,325,800 B2* | 12/2012 | Holcomb | | H04N 19/147 375/240.03 |
| 8,806,050 B2* | 8/2014 | Chen | | H04L 65/607 709/227 |
| 9,253,240 B2* | 2/2016 | Chen | | H04N 21/235 |
| 9,262,419 B2* | 2/2016 | Dalal | | G11B 27/36 |
| 9,386,064 B2* | 7/2016 | Luby | | H04N 21/23106 |
| 2004/0146285 A1* | 7/2004 | Matsui | | G11B 27/005 386/244 |
| 2010/0114921 A1* | 5/2010 | Bocharov | | H04L 29/06027 707/758 |
| 2010/0189183 A1* | 7/2010 | Gu | | H04N 21/23439 375/240.28 |
| 2010/0235472 A1* | 9/2010 | Sood | | H04L 65/4092 709/219 |
| 2010/0262711 A1* | 10/2010 | Bouazizi | | H04L 65/00 709/231 |
| 2011/0096828 A1* | 4/2011 | Chen | | H04N 21/23106 375/240.02 |
| 2011/0296048 A1* | 12/2011 | Knox | | H04L 65/605 709/231 |
| 2012/0023249 A1* | 1/2012 | Chen | | H04N 21/235 709/231 |
| 2012/0185570 A1* | 7/2012 | Bouazizi | | H04N 21/44016 709/219 |
| 2012/0203868 A1* | 8/2012 | Myers | | H04N 21/234327 709/219 |
| 2013/0051774 A1* | 2/2013 | Hosokawa | | H04N 5/765 386/326 |
| 2013/0147914 A1* | 6/2013 | Park | | H04N 13/0059 348/43 |
| 2014/0304303 A1* | 10/2014 | Dalal | | G06F 17/30017 707/797 |

* cited by examiner

METHOD AND A SYSTEM FOR SMOOTH STREAMING OF MEDIA CONTENT IN A DISTRIBUTED CONTENT DELIVERY NETWORK

FIELD OF THE ART

The present invention generally relates, in a first aspect, to a method for smooth streaming of media content in a distributed content delivery network, comprising a SSS smooth streaming a requested stream fragment to an end user, after retrieving it out of encoded original media files using an index jump table, and more particularly to a method which frees the SSS of the task of calculating index jump tables, as they are pre-calculated by means of an external indexing entity.

A second aspect of the invention relates to a system adapted to implement the method of the first aspect.

PRIOR STATE OF THE ART

Microsoft® Smooth Streaming (MSS) is a video delivery protocol created by Microsoft® and it is implemented in their Microsoft® Internet Information Server (IIS).

MSS is used by many video subscriptions services (like Netflix®) and IPTV solutions (like Telefonica Global Video Platform).

Some relevant MSS features are:
Multi-bitrate video delivery
Multiple audio tracks
Multiple subtitle tracks
Content protection with DRM.

Currently, Microsoft® Content Delivery workflow works in the following way:
  Multimedia assets (Video, audio, subtitles) are processed by a Microsoft® tool called Microsoft® Expression Encoder: This tool processes all input files and generates a new set of MSS files that represent the content ready for delivery. These generated files include a manifest file and some media files, which contain one or more of the original assets ready to be fragmented.
  These MSS files are then copied to a Microsoft® Server running IIS to perform content delivery to end-users.
  When users request to start viewing a specific content, the server sends them the corresponding manifest file with the description of the available audio, video and subtitle tracks for that content. This track description includes track bitrate quality and other characteristics.
  With this information users can then request the server stream fragments for a specific track, quality and time offset.
  When the server receives one of these MSS track, quality and time offset requests by users, it loads some media files into memory to compute some tables to map time offsets to physical byte offsets.

FIG. 1 represents the standard content flow when using Microsoft® technologies. Ingestion and real time parts are separated to clearly identify which processes are directly related to real time processing and distribution issues.

The ingestion part is only performed once. In this stage original media files are processed so they can be served as Smooth Streaming content. In this step, all the SS files have to be copied in a Microsoft® IIS server which is able to serve fragments by using the SS files.

In the real time delivery stage the server processes any request performed by end users.

Any processing that could be moved from the real time delivery stage to the ingestion stage would incur in significant savings for the content delivery network in charge of distributing that content.

Any procedure that could avoid having the whole SS files stored previously to serve the content would bring relevant storage savings in the end user server, as the content could be downloaded on demand.

Next, some patent documents disclosing proposals linked to fragmented stream protocols are cited. Most of them are centered in encoding and stream selection methods, topics that are unrelated to the present invention.

Some of these patents mention an index, which, as will be seen below, is a concept frequently used in the description of the present invention. However, the index mentioned in these patents is what in preceding sections has been called the manifest of the content, which is a description of the available tracks and their characteristics for a specific content. As the description of the present invention will show below, this prior art index is associated to a concept which is different to the one to which the jump index table of the present invention is associated to.

U.S. Pat. No. 7,818,444B2 describes a system to serve fragmented streams and describes some mechanisms for quality selection. Mentions indices but, as previously explained, they refer to what has been called above manifests.

US2010/0189183A1, WO2012/078655A1 and U.S. Pat. No. 8,325,800B2 disclose proposals centered in stream encoding using variable bitrate and other techniques, US2010/0189183A1 mentions indices too but, again, in an unrelated sense to what indices in the present invention are called.

U.S. Pat. No. 7,925,774B2, U.S. Pat. No. 8,265,140B2, U.S. Pat. No. 7,949,775B2 are centered in methods for media stream clients to switch to different qualities depending on the state of the connection and other considerations. U.S. Pat. No. 7,925,774B2 and U.S. Pat. No. 8,265,140B2 mention indices too but in the same sense the above patent documents do.

Problems with Existing Solutions

Transforming time offsets to physical file offsets is straightforward to do when the number of contents served by a server is small but when the number of contents served in parallel increases, the system performance starts degrading, making it unable to serve more requests after a certain point.

Additionally, this scenario presents scalability issues when the content has to be distributed among a set of service nodes. The diagrams of FIGS. 2 and 3 show the two possible configurations serving Smooth Streaming content using regular Microsoft® Servers running IIS and their drawbacks.

Configuration A (FIG. 2):
  In this configuration the files generated by the encoder for a specific content (SS files) have to be sent to each service node (MS IIS) in order to serve any fragment of the stream to the end users.
  This scenario poses the following drawbacks:
  Even if a service node only receives requests for a small subset of the fragments of a video, it will need all the files the encoder generated for that stream. This will incur in unnecessary usage of the disk cache space of the service node, i.e. of the MS IIS.
  In case the service node did not have the file ready in its cache, users requesting the stream would notice a significant delay in receiving an answer until the service node manages to get the media files. A way to avoid this drawback is copying the whole content files in the MMS files, which will imply even higher usage of disk cache space of the service node.

Jump tables will have to be calculated every time by the service node for every request increasing the CPU usage of the service node unnecessarily.

Configuration B (FIG. 3):

In this configuration there is only one MS ISS server with all the files generated by the encoder. End users request fragments to proxy service nodes, which in their turn make the same request to the MS ISS server.

This scenario, even though does not have the unnecessary cache space usage problem Configuration A had, poses the following drawbacks:

The MS ISS origin network elements need to calculate jump tables for many different service nodes that request fragments to them. This, as explained before, with a big enough number of different content to serve causes a big CPU penalty on these servers.

As the service node only requests fragments to their origin server as they receive requests from the end users, there is no prefetching of stream data which will be probably asked later by the same end users. This will result in the following problems:

The data transfer between the MS IIS origin server and the service nodes will have all the overhead of an HTTP fragmented protocol like Smooth Streaming, which results in a less efficient way of sending this media data compared to sending a big block of media stream in one request.

It will make it difficult for the service nodes to share their already cached content between them.

Not performing prefetching will cause a constant penalty in latency for the end user.

DESCRIPTION OF THE INVENTION

It is an object of the present invention to provide an alternative to the prior state of the art, which covers the gaps found therein, by providing a method and a system that performs a media streaming smoother than the ones of the prior art, i.e. with reduced playback startup latency and reduced cuts during playback, if any.

To that end, the present invention relates, in a first aspect, to a method for smooth streaming of media content in a distributed content delivery network, comprising:

encoding original media files by means of an encoding entity;

requesting an end user, via an end user client device, to a Smooth Streaming Server (SSS), such as the MS IIS, a stream fragment for a specific track, quality and time offset of a media file; and said SSS using a specific index jump table containing track, quality and a mapping of time offsets to file and byte offsets, to retrieve from the encoded original media files the requested stream fragment and to deliver the latter to the end user client device, via smooth streaming.

Contrary to the known methods, the one of the first aspect of the present invention comprises performing the following steps:

providing, said encoding entity, the encoded original media files to an indexer entity;

calculating, said indexer entity, said specific and others index jump tables containing track, quality and a mapping of time offsets to file and byte offsets for all the encoded original media files;

ingesting, said indexer entity, at least said index jump tables to an origin server;

ingesting, said encoding entity directly or through said indexer entity, the encoded original media files to said origin server;

retrieving, said SSS from said origin server, the requested specific index jump table out of said index jump tables;

reading, the SSS, the specific index jump table and looking what byte offset and what encoded original media file block needs so it can serve the end user request, retrieving, said SSS from said origin server, the needed encoded original media file block;

and retrieving, the SSS, the requested stream fragment out of said encoded media file block, and sending the requested stream fragment to the end user client device, via smooth streaming.

For a preferred embodiment, said origin server is a stateless origin server, as no need of tracking information regarding previous requests is needed according to the method of the first aspect of the invention.

Said indexer entity is external and independent to said SSS.

For an embodiment, the SSS retrieves from the origin server said specific index jump table and/or said needed encoded original media file block on demand, upon the reception of said end user request.

For an alternative embodiment, the SSS retrieves from the origin server the specific index jump table and/or the needed encoded original media file block by prefetching index jump tables and/or encoded original media file blocks previously to the end user request, the method comprising the SSS, upon the reception of the end user request, checking if the requested specific index jump table and/or the needed encoded original media file block is within the prefetched information, and if so directly retrieving it out of said prefetched information.

The method of the first aspect of the invention further comprises, for an embodiment:

calculating, the indexer entity, key frame files for fast-forward and fast-rewind of a stream play, each key frame file containing intra frames for a specific quality of all encoded video files, of the encoded original media files, wherein the above mentioned index jump tables additionally contain mappings from track, quality and time offsets to said key frame files and byte offsets;

ingesting, the indexer entity, said key frame files to the origin server;

requesting the end user, via the end user client device, to the SSS, a fast-forward or fast-rewind for a stream fragment of a specific track; and retrieving, the SSS from the origin server, out of said key frame files at least the key frame necessary information for serving the end user client device with the necessary fast-forward or fast-rewind frames which allows performing said requested fast-forward or fast-rewind for said stream fragment of said specific track.

For a variant of said embodiment, the SSS retrieves from the origin server the key frame necessary information by downloading blocks of key frame files on demand, upon the reception of said fast-forward or fast-rewind end user request.

For an alternative variant of said embodiment, the SSS retrieves from the origin server the key frame necessary information by prefetching key frame files when any fragment for a corresponding stream quality is requested by the end user.

According to an embodiment, the encoded media file block is bigger than the requested stream fragment, the method comprising the SSS storing said encoded media file block in order to directly serve subsequent user requests for stream fragments without requests to the origin server.

The method comprises, for an embodiment, the SSS prefetching encoded media file blocks in order to directly serve subsequent user requests for stream fragments without requests to the origin server, said prefetching including a wider range of bytes of encoded media files corresponding to the requested video quality, audio language or key frames.

Preferably, the method of the first aspect comprises smooth streaming media content for a plurality of end users through several Smooth Streaming Servers, all of them bidirectionally connected to said origin server to serve end users by performing the same operations than said SSS.

For an embodiment, the method comprises said SSSs sharing prefetched content with each other.

A second aspect of the present invention relates to a system for smooth streaming of media content in a distributed content delivery network, comprising:
    an encoding entity configured for encoding original media files;
    a Smooth Streaming Server SSS configured and arranged for accessing the original media files once encoded by the encoding entity and to deliver fragments thereof to an end user client device, via smooth streaming; and
    an end user client device configured and arranged for requesting to said SSS a stream fragment for a specific track, quality and time offset of a media file;
    wherein said SSS has access to a specific index jump table containing track, quality and a mapping of time offsets to file and byte offsets, and is configured for using said specific index jump table to retrieve from the encoded original media files the requested stream fragment and to deliver the latter to the end user, via smooth streaming.

Contrary to the known systems, the one proposed by the second aspect of the invention implements the method of the first aspect of the invention, to which end the system further comprises:
    a origin server, preferably a stateless origin server; and
    an indexer entity with an input connected to an output of said encoding entity to receive the original media files once encoded thereby, and configured and arranged for performing said calculation of index jump tables and their ingestion to said origin server;
    wherein said origin server is arranged to receive by ingestion the encoded original media files from the encoding entity, directly or through said indexer entity, and is connected to said SSS to retrieve at least said specific index jump table and said needed encoded media file block; and
    wherein the SSS is configured for processing said index jump tables to perform straight translation between time-based requests and physical file requests in real time.

BRIEF DESCRIPTION OF THE DRAWINGS

The previous and other advantages and features will be better understood from the following detailed description of embodiments, with reference to the attached drawings (some of which, particularly FIGS. 1 to 3, have been used in the Prior State of the Art section to describe conventional proposals), which must be considered in an illustrative and non-limiting manner, in which.

DETAILED DESCRIPTION OF SEVERAL EMBODIMENTS

The method and system of the present invention provides an alternative mechanism to increase scalability, which, depending on the embodiment, includes some or all of the next features:
    An additional stage to be performed after the content is prepared by Microsoft® Expression Encoder that generates pre-calculated jump tables (index files) and key frame tables (key frame files) for fast-forward and rewind. This step is made in the ingestion process, so there are no real time processing issues.
    An optimized Microsoft® Smooth Streaming Server that understand the pre-calculated tables generated in the step above and that can make straight translation between time-based requests and physical file requests. This is made in real time, so the translation reduces the processing time and the size of content to be loaded in the server.
    A standard content server (e.g. Apache) can be used to serve SS files, index and key frames files on demand to the Optimized MMS Server. In this way, it is not required to load the whole content files in the Optimized MMS Server.

Figure 4:
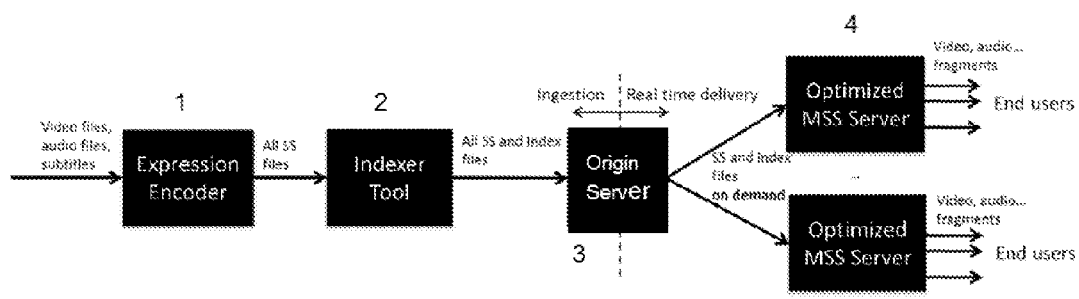
FIG. 4 schematically shows the system of the second aspect of the invention used to implement the method of the first aspect, for an embodiment intended only for serving stream fragments.

FIG. 4 schematically shows the system of the second aspect of the invention used to implement the method of the first aspect, for an embodiment intended only for serving stream fragments. The depicted system includes a standard content flow when using Microsoft® technologies from the reception of media files and the encoding and the delivering thereof by means of a standard Expression Encoder 1, at the output thereof an Indexer tool/Entity 2, an Origin Server 3 and several Optimized MSS Servers 4 are connected.

Figure 5:
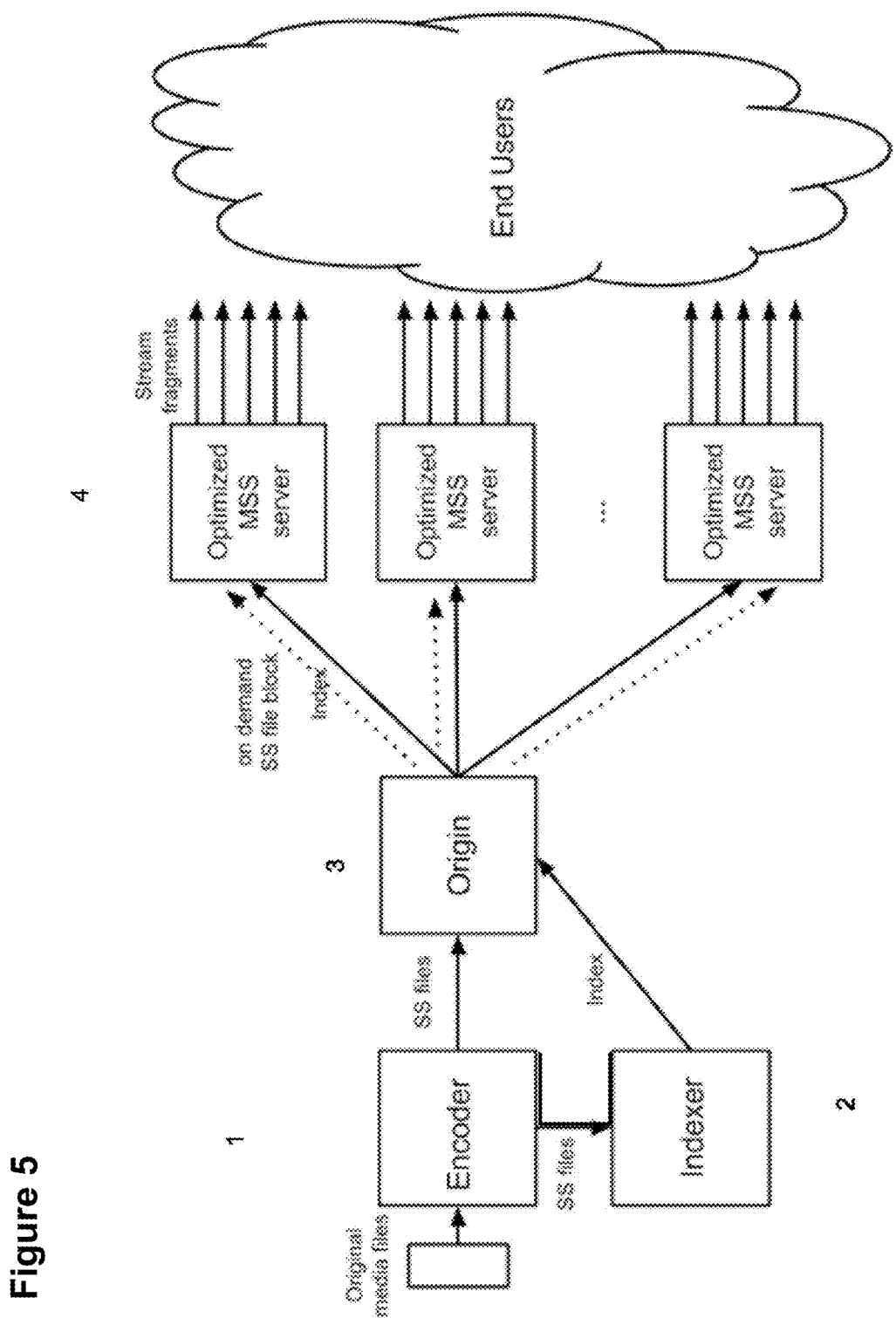
FIG. 5 also schematically shows the system of the second aspect of the invention used to implement the method of the first aspect, for a slight variation of the embodiment of FIG. 4.

FIG. 5 represents the same embodiment of FIG. 4 but with the slight variation than an input of the Origin Server 3 is connected directly to an output of the Encoder 1 in order to receive directly the SS files, i.e. the encoded original media files, from the Encoder 1, i.e. without passing through the Indexer Entity 2.

For the embodiment of FIGS. 4 to 7, the Indexer entity 2 performs the following operations in the input files, i.e. in all the encoded original media files prepared for streaming, i.e. according to the Smooth Streaming File format, which follows the ISO/IEC 14496-12:2005 specification (technically identical to ISO/IEC 15444-12:2005):

For each track in the input files:
process all MOOF (movie fragments) and MDAT (meta data) boxes; and
process all MFRA (Movie Fragment Random Access) boxes, and for each timestamp in TFRA (Track Fragment Random Access) generate a file offset, size entry corresponding to the above mentioned mapping of time offsets to file and byte offsets of the jump table.

Figure 6:
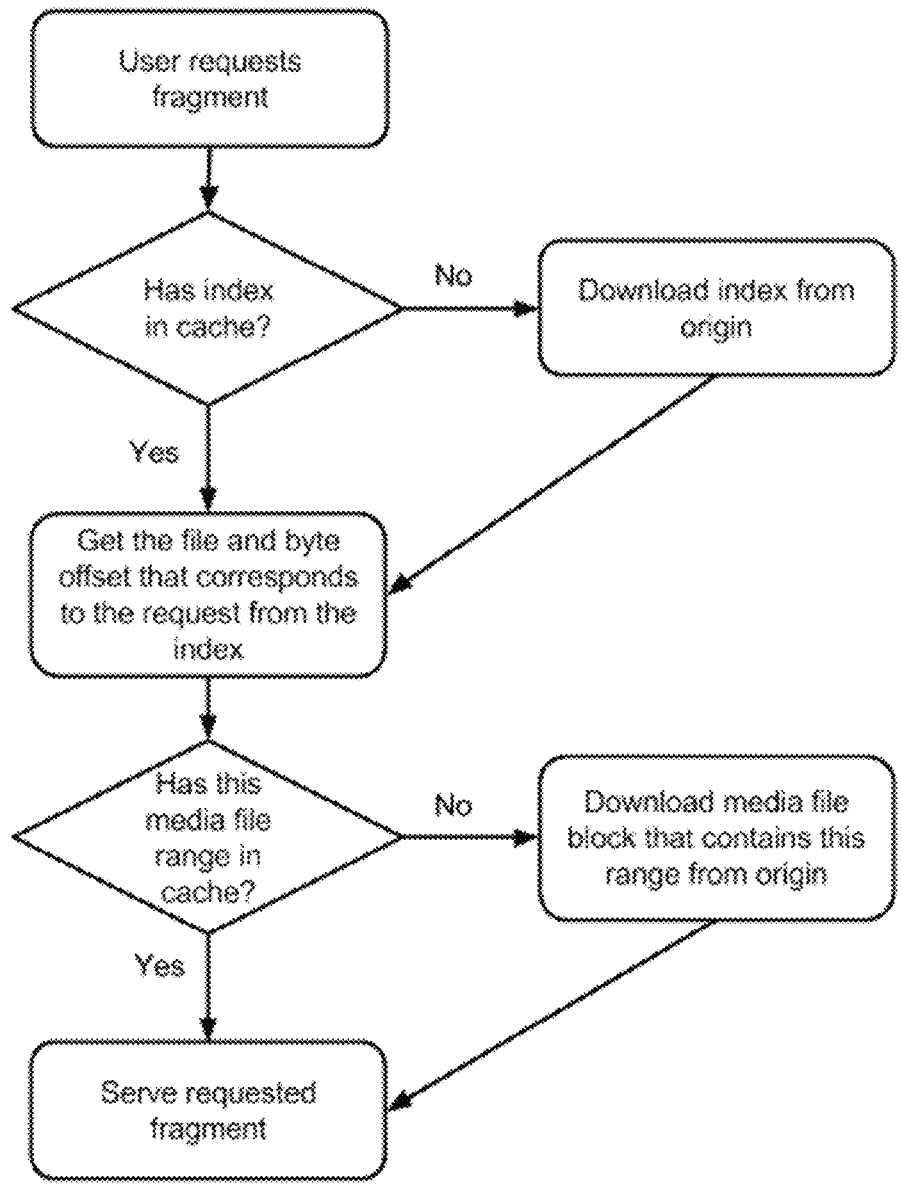
FIG. 6 is a flow chart representing the operation performed by the SSS for serving a stream fragment upon request, for an embodiment of the method of the first aspect of the invention.

The Optimized MSS Server 4 performs the operations indicated in the flow chart of FIG. 6 when receives user requests, i.e.:

Checks if it has the index file corresponding to the user request; if not, it will download it from the origin server 3 and store it in the cache to be ready for subsequent requests.

With the index available, it will read the index and look what byte offset and what SS file needs so it can serve this request.

With this information, it will check if it has this SS file part available in its cache, if not it will download it from the origin server 3 and store it in the cache.

When downloading SS file parts from the origin server 3, an efficient strategy, that will optimize origin to service node transfer efficiency and speed up subsequent user requests, is downloading an SS file block bigger than what it is required to just serve the user request.

With the corresponding SS file part ready in its cache, the MSS Server 4 can answer the user request with the SS file fragment that corresponds to it.

The diagram of FIG. 7 describes the process from ingestion to delivery, for a specific implementation of the embodiment of FIGS. 4 to 7, i.e. for serving only stream fragments, and is described below.

In the ingestion part, a Content provider delivers to the Encoder in order the latter encode them, the Encoder sending the encoded files to the Indexer (previously called Indexer Entity/Tool) in order the latter perform the indexing thereof, the Indexer ingest all the encoded files and index for all files, i.e. the above called index jump tables, to the Origin Server.

Figure 7:
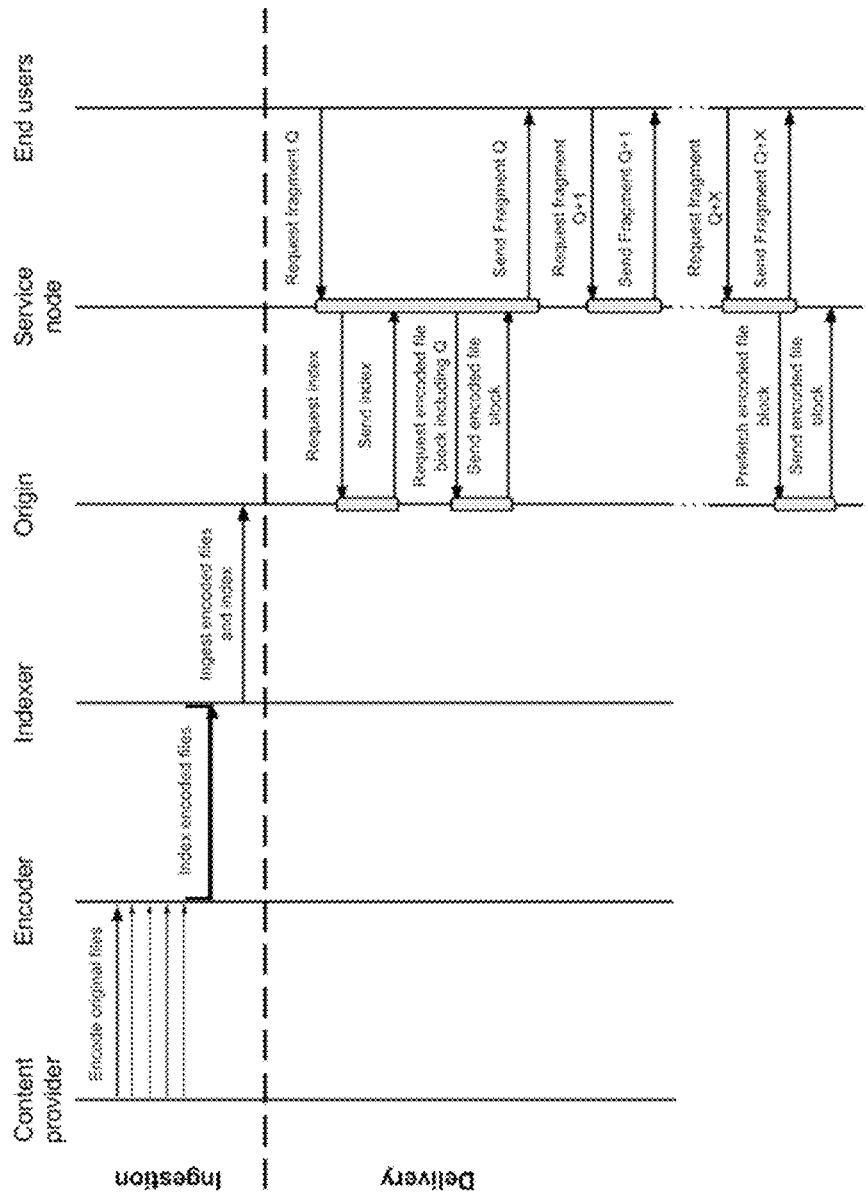
FIG. 7 is a diagram describing the process from ingestion to delivery according to an embodiment of the method of the first aspect of the invention intended for serving stream fragments.

In the delivery part of the diagram of FIG. 7, one or more End users request a stream fragment Q to the Service node, i.e. to the MSS Server, the latter requesting to the Origin Server the specific index for said requested fragment, which sends it to the Service node, then the Service node reads the received index, i.e. index jump table, and based in the information retrieved therefrom requests an encoded file block to the Origin Server, the latter sending the requested block to the Service node. Then, the Service block attends the fragment request and further fragment (Q+1 . . . Q+X) requests by retrieving said fragments from the received block and sending them to the End users.

Finally, following with the diagram of FIG. 7, in order to have stored beforehand fragments to be requested by End users, the Service node requests to the Origin Serve a further encoded file block in order to prefetch it in the Service node cache.

Although not indicated in the diagram of FIG. 7, index jump tables can also be prefetched in the Service node, for other implementation of the embodiment of FIGS. 4 to 7.

The MSS protocol additionally provides capabilities to allow client players to fast-forward and fast-rewind a video track and watch the stream play at a higher speed. These are triggered by the player issuing a specific request that the server treats especially.

When Microsoft® ISS servers receive this kind of request for a video track, it sends a quick succession of frames to the user, which they correspond to a subset of the intra frames of that track. In the context of video encoding, intra frames, are frames that are independently encoded in respect to any other frames of the video stream, and thus, they contain all the necessary information to be fully decoded by themselves.

Using the above described implementation of the embodiment of FIGS. 4 to 7 of the method and system of the present invention presents some problems implementing this feature because needing to serve, almost at the same time, little bits of information spread over an entire SS file, means needing to have a big proportion, if not all, of the SS files of a stream already stored in the service node caches in case one of these requests arrive.

Figure 8:
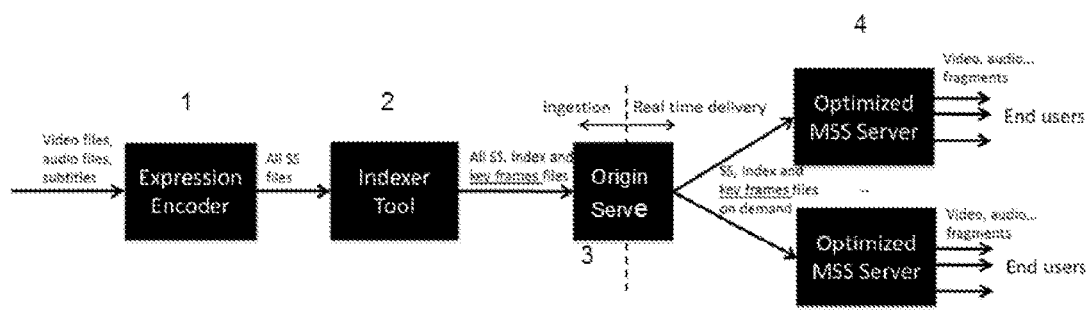
FIG. 8 is analogous to FIG. 4, but in this case the depicted system is used for implementing the operations of the method of the first aspect of the invention for an embodiment intended for attending, not only stream fragments requests, but also fast-forward or fast-rewind requests.
Figure 9:
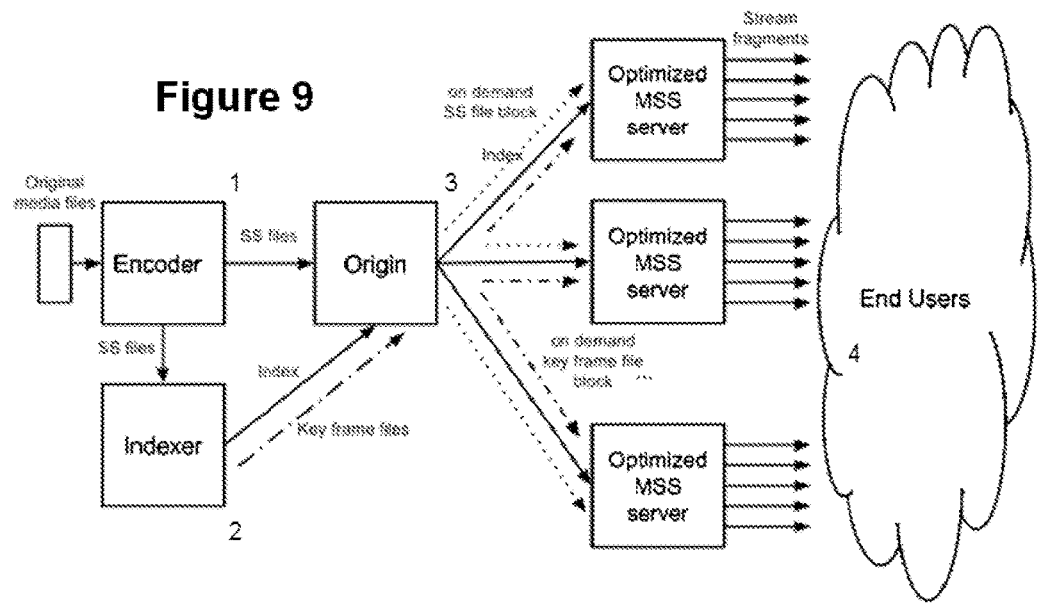
FIG. 9 is analogous to FIG. 5, but for implementing the operations of the method of the first aspect of the invention for attending also fast-forward or fast-rewind requests.
Figure 10:
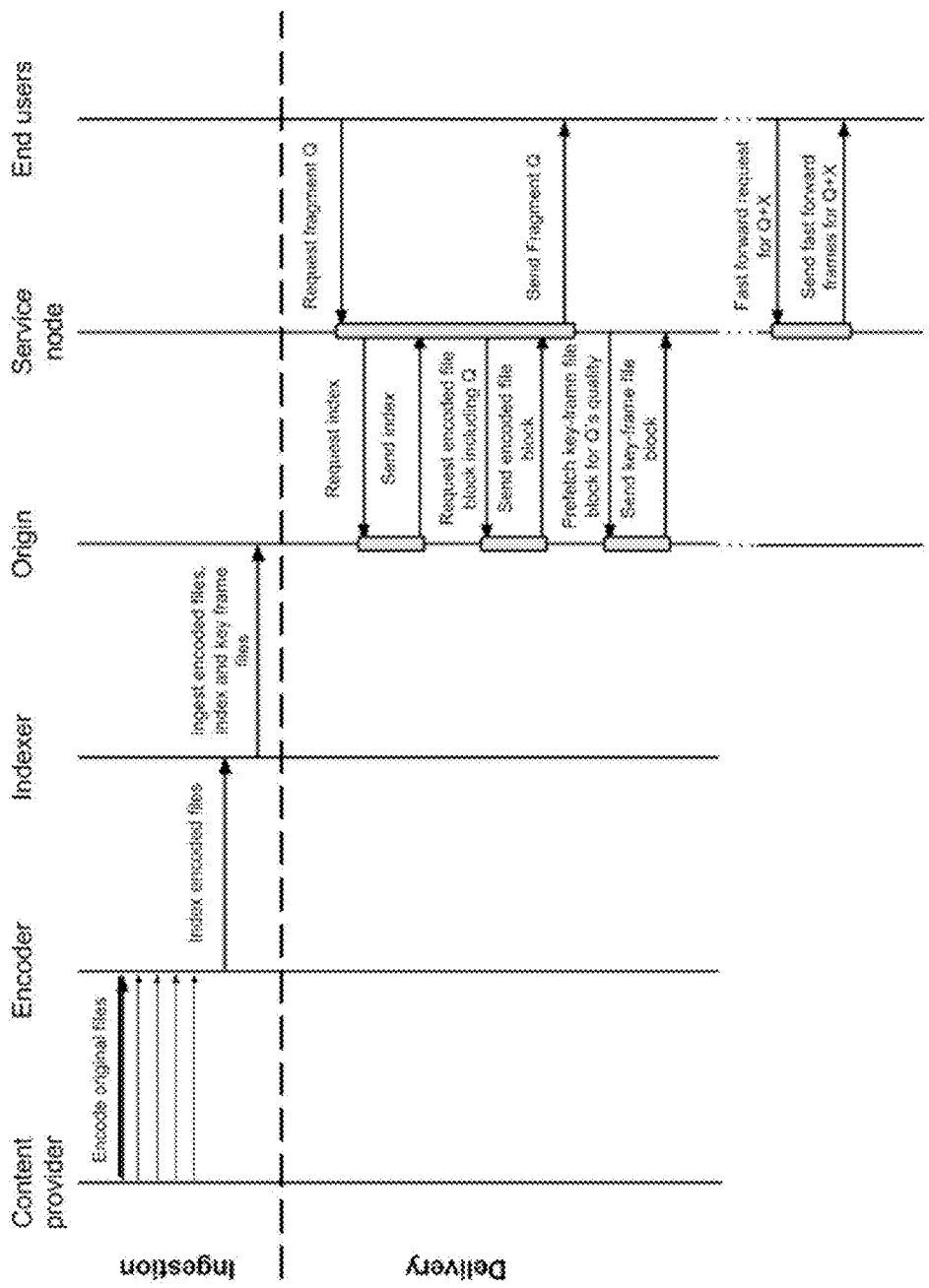
FIG. 10 is a diagram describing the process from ingestion to delivery according to an embodiment of the method of the first aspect of the invention intended for serving stream fragments and also fast-forward frames.

In order to keep the advantages that the system ad method of the present invention provide and, at the same time, be able to serve these fast-forward and fast-rewind requests, the following additions have been developed to the initial configuration, thus constituting the embodiment shown in FIGS. 8 to 10:

In the indexing step, what have been called here keyframe files are generated by the Indexer Entity 2. Each of these files contains the intra frames for a specific quality of the SS files.

Still in the indexing step, the resulting index, apart from containing track, quality and time offsets to file and byte offset jump tables, it additionally contains mappings from track, quality and time offsets to key frame files and byte offsets, therefore the diagram of FIG. 7 referring to the process from ingestion to delivery, would apply similarly with the addition of key frame files, resulting in the diagram of FIG. 10.

Different download strategies are implemented in the Optimized MSS server 4 in order to have these key frame files ready in their caches. One of these strategies would be downloading, from Origin Server 3, blocks of these key frame files on demand. Another option, considering these key frame files are significantly smaller than their full SS file counterparts (around 10-15% of their size) they could be fully prefetched when any fragment for a corresponding stream quality is requested by a user.

When the Optimized MSS server 4 receives one of these fast-forward or fast-rewind requests, using any of the mentioned download strategies it gets the key frame necessary information in its cache and serves it to the user.

Taking these considerations into account, the previously shown configuration diagrams of FIGS. 4 and 5 would become like the ones of FIGS. 8 and 9.

The diagram of FIG. 10 shows how the flow to serve a fast forward request would be when implementing a prefetch strategy for key-frame file blocks, and differs from the diagram of FIG. 7 in that the indexer also generates the key-frame files and sends them, together with the index jump tables, to the Origin Server, and in that it further includes the following steps, to be performer in the Delivery part:

The Service node prefetch key-frame file block for Q's quality, i.e. for quality of the requested fragment Q, by requesting such a block to the Origin Server, the latter, in response to the request, sending the requested key-frame file block to the Service node. With this key-frame block prefetched, the Service node can attend End user requests for fast-forward (or fast-rewind) for fragment Q+X.

For this embodiment of FIGS. 8 to 10, the indexing operation in each SS file would include this key frame file treatment which would result in the following:

For each video Track in the input files, i.e. of the encoded video files:
  Create a new key frame file as follows:
    For each Video fragment:
      Read MOOF Box and resize it to one sample describing one intra frame.
      Write said new resized MOOF Box.
      Read MDAT Box and resize it to one sample containing said intra frame.
      Write said new resized MDAT Box.
For each track in the new input files, files which include the encoded original media files and the created key frame files:
  Process all MOOF and MDAT boxes.
  Process all MFRA boxes, and for each timestamp in TFRA generate a file offset, size entry.

Advantages of the Invention

With the system and method of the present invention a distribution of media content over a set of service nodes (Optimized MMS Servers) in a more efficient way is achieved solving the scalability issues found with the conventional delivery mechanisms.

With the proposed configurations, a regular stateless server origin contains all the media files generated by the encoder plus an index and key frame files generated by an indexer entity. These key frame files allow end users to fast rewind or fast forward a stream they are playing.

When service nodes receive a request for a media fragment they first need to get this index file. The index file allows the service node to convert the user request from track, quality and time offset to a file and byte offset which allows the service node to request a media block for a file from the origin.

With this configuration the aforementioned scalability problems are solved:
  CPU usage is no longer a problem as the jump table from track, quality and time offset to file byte offset are already pre-calculated.
  The service node does not need to waste space in their cache downloading the whole media content to serve a few fragments.
  The end user never has to incur in big latency penalties in case the service node they request the content does not have the content already cached, the service node now can ask the origin for the right offset of the encoded file it needs to serve.
  Allowing the service node to have this information allows it to ask the origin for a bigger chunk of the media stream and, in this way, it will prefetch content it will be probably be asked right away in subsequent end user requests. This prefetch can include a wider range of bytes of SS files corresponding to the requested video quality, audio language or key frames.

Figure 1:
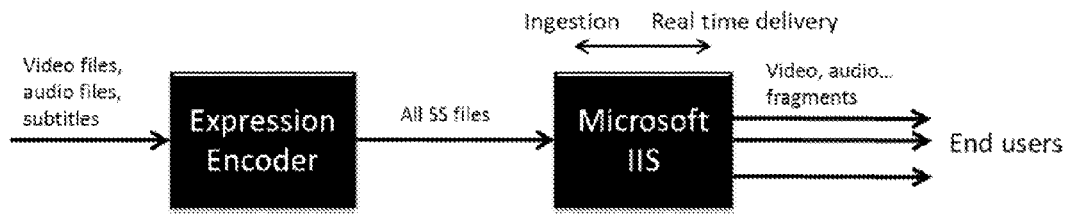
FIG. 1 represents the standard content flow when using Microsoft® technologies. Ingestion and real time parts are separated to clearly identify which processes are directly related to real time processing and distribution issues.
Figure 2:
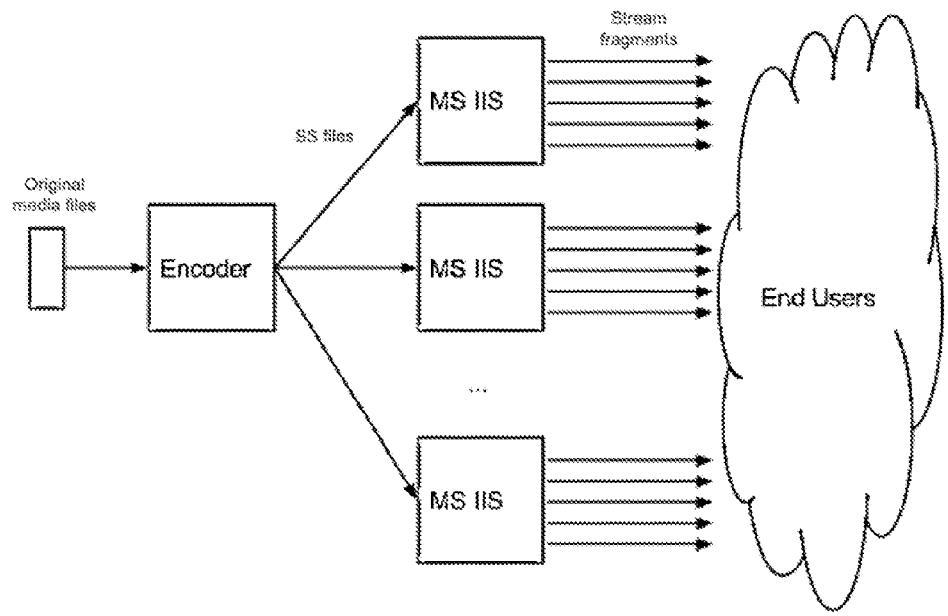
FIGS. 2 and 3 respectively show the above described prior art Configurations A and B for serving Smooth Streaming content using regular Microsoft® Servers running IIS.
Figure 3:
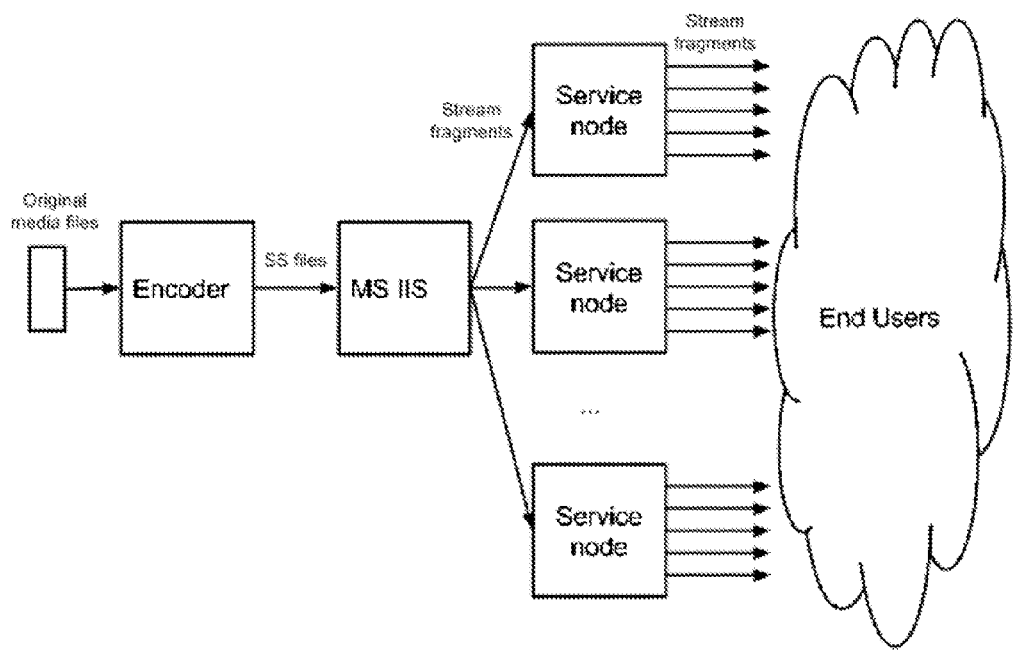

This prefetch capability will allow service nodes to share content more easily between them and will remove any protocol overhead the previously mentioned Configuration B (FIG. 3) had.

A person skilled in the art could introduce changes and modifications in the embodiments described without departing from the scope of the invention as it is defined in the attached claims.

The invention claimed is:

1. A method for smooth streaming of media content in a distributed content delivery network, comprising:
  encoding original media files by means of an encoding entity;
  requesting by an end user, via an end user client device, to a Smooth Streaming Server (SSS) a stream fragment for a specific track, quality and time offset of a media file; and
  said SSS using a specific index jump table containing track, quality and a mapping of time offsets to file and byte offsets, to retrieve from the encoded original media files the requested stream fragment and to deliver the latter to the end user client device, via smooth streaming;
  wherein the method is characterized in that it comprises performing the following steps:
  providing, by said encoding entity, the encoded original media files to an indexer entity;
  calculating, by said indexer entity, said specific and others index jump tables containing track, quality and a mapping of time offsets to file and byte offsets for all the encoded original media files;
  ingesting, by said indexer entity, at least said index jump tables to a origin server;
  ingesting, by said encoding entity directly or through said indexer entity, the encoded original media files to said origin server;
  retrieving, by said SSS from said origin server, the requested specific index jump table out of said index jump tables;
  reading, by the SSS, the specific index jump table and looking what byte offset and what encoded original media file block needs so it can serve the end user request,
  retrieving, by said SSS from said origin server, the needed encoded original media file block;
  retrieving, by the SSS, the requested stream fragment out of said encoded media file block, and sending the requested stream fragment to the end user client device, via smooth streaming
  calculating, by said indexer entity, key frame files for fast-forward and fast-rewind of a stream play, each key frame file containing intra frames for a specific quality of all encoded video files, of the encoded original media files, wherein said index jump tables additionally contain mappings from track, quality and time offsets to said key frame files and byte offsets;
  ingesting, by said indexer entity, said key frame files to the origin server;
  requesting by said end user, via said end user client device, to said SSS a fast-forward or fast-rewind for a stream fragment of a specific track; and
  retrieving, by said SSS from said origin server, out of said key frame files at least the key frame necessary information for serving the end user client device with the necessary fast-forward or fast-rewind frames which allows performing said requested fast-forward or fast-rewind for said stream fragment of said specific track wherein said indexer entity performing the following operations:

for each track of the encoded original video files:
create a new key frame file as follows:
for each video fragment:
read MOOF Box and resize it to one sample describing one intra frame;
write said new resized MOOF Box;
read MDAT Box and resize it to one sample containing said intra frame;
write said new resized MDAT Box;
and
for each track in the input files which include the encoded original media files and the created key frame files:
process all MOOF and MDAT boxes; and
process all MFRA boxes, and for each timestamp in TFRA generate a file offset, size entry.

2. The method of claim 1, wherein said origin server is a stateless origin server.

3. The method of claim 1, wherein said SSS retrieves from said origin server said specific index jump table and/or said needed encoded original media file block on demand, upon the reception of said end user request.

4. The method of claim 1, wherein said SSS retrieves from said origin server said specific index jump table and/or said needed encoded original media file block by prefetching index jump tables and/or encoded original media file blocks previously to said end user request, the method comprising the SSS, upon the reception of said end user request, checking if the requested specific index jump table and/or the needed encoded original media file block is within the prefetched information, and if so directly retrieving it out of said prefetched information.

5. The method of claim 1, wherein said SSS retrieves from said origin server said key frame necessary information by downloading blocks of key frame files on demand, upon the reception of said fast-forward or fast-rewind end user request.

6. The method of claim 1, wherein said SSS retrieves from said origin server said key frame necessary information by prefetching key frame files when any fragment for a corresponding stream quality is requested by said end user.

7. The method of claim 1, wherein said encoded media file block is bigger than the requested stream fragment, the SSS storing said encoded media file block in order to directly serve subsequent user requests for stream fragments without requests to the origin server.

8. The method of claim 7, comprising smooth streaming media content for a plurality of end users through several Smooth Streaming Servers, all of them bidirectionally connected to said origin server to serve end users by performing the same operations than said SSS.

9. The method of claim 8, comprising, sharing by said SSSs prefetched content with each other.

10. The method of claim 1, comprising, by the SSS, prefetching encoded media file blocks in order to directly serve subsequent user requests for stream fragments without requests to the origin server, said prefetching including a wider range of bytes of encoded media files corresponding to the requested video quality, audio language or key frames.

11. The method of claim 1, comprising performing by said indexer entity performing the following operation for each track of the encoded original media files:
process all MOOF and MDAT boxes; and
process all MFRA boxes, and for each timestamp in TFRA generate a file offset, size entry corresponding to said mapping of time offsets to file and byte offsets of the jump table.

12. A system for smooth streaming of media content in a distributed content delivery network, comprising:
an encoding entity (1) configured for encoding original media files;
a Smooth Streaming Server (4), SSS, configured and arranged for accessing the original media files once encoded by the encoding entity (1) and to deliver fragments thereof to an end user client device, via smooth streaming; and
an end user client device configured and arranged for requesting to said SSS (4) a stream fragment for a specific track, quality and time offset of a media file;
wherein said SSS (4) has access to a specific index jump table containing track, quality and a mapping of time offsets to file and byte offsets, and is configured for using said specific index jump table to retrieve from the encoded original media files the requested stream fragment and to deliver the latter to the end user, via smooth streaming;
wherein the system is characterized in that it implements the method of claim 1, to which end the system further comprises:
a origin server (3);
an indexer entity (2) with an input connected to an output of said encoding entity (1) to receive the original media files once encoded thereby, and configured and arranged for performing said calculation of index jump tables and their ingestion to said origin server (3);
wherein said origin server (3) is arranged to receive by ingestion the encoded original media files from the encoding entity (1), directly or through said indexer entity (2), and is connected to said SSS to retrieve at least said specific index jump table and said needed encoded media file block; and
wherein said SSS (4) is configured for processing said index jump tables to perform straight translation between time-based requests and physical file requests in real time
wherein said indexer entity is configured to perform the following operations:
for each track of the encoded original video files:
create a new key frame file as follows:
for each video fragment:
read MOOF Box and resize it to one sample describing one intra frame;
write said new resized MOOF Box;
read MDAT Box and resize it to one sample containing said intra frame;
write said new resized MDAT Box;
and
for each track in the input files which include the encoded original media files and the created key frame files:
process all MOOF and MDAT boxes; and
process all MFRA boxes, and for each timestamp in TFRA generate a file offset, size entry.

13. The system of claim 12, wherein said origin server (3) is a stateless origin server.

* * * * *